F. O. HARTMAN AND C. T. ANDERSON.
SPECIFIC GRAVITY DEVICE.
APPLICATION FILED MAY 24, 1920.

1,424,403.

Patented Aug. 1, 1922.
2 SHEETS—SHEET 1.

Frank O. Hartman
Clark T. Anderson
INVENTORS

BY Richey Slough & Tales

THEIR ATTORNEYS

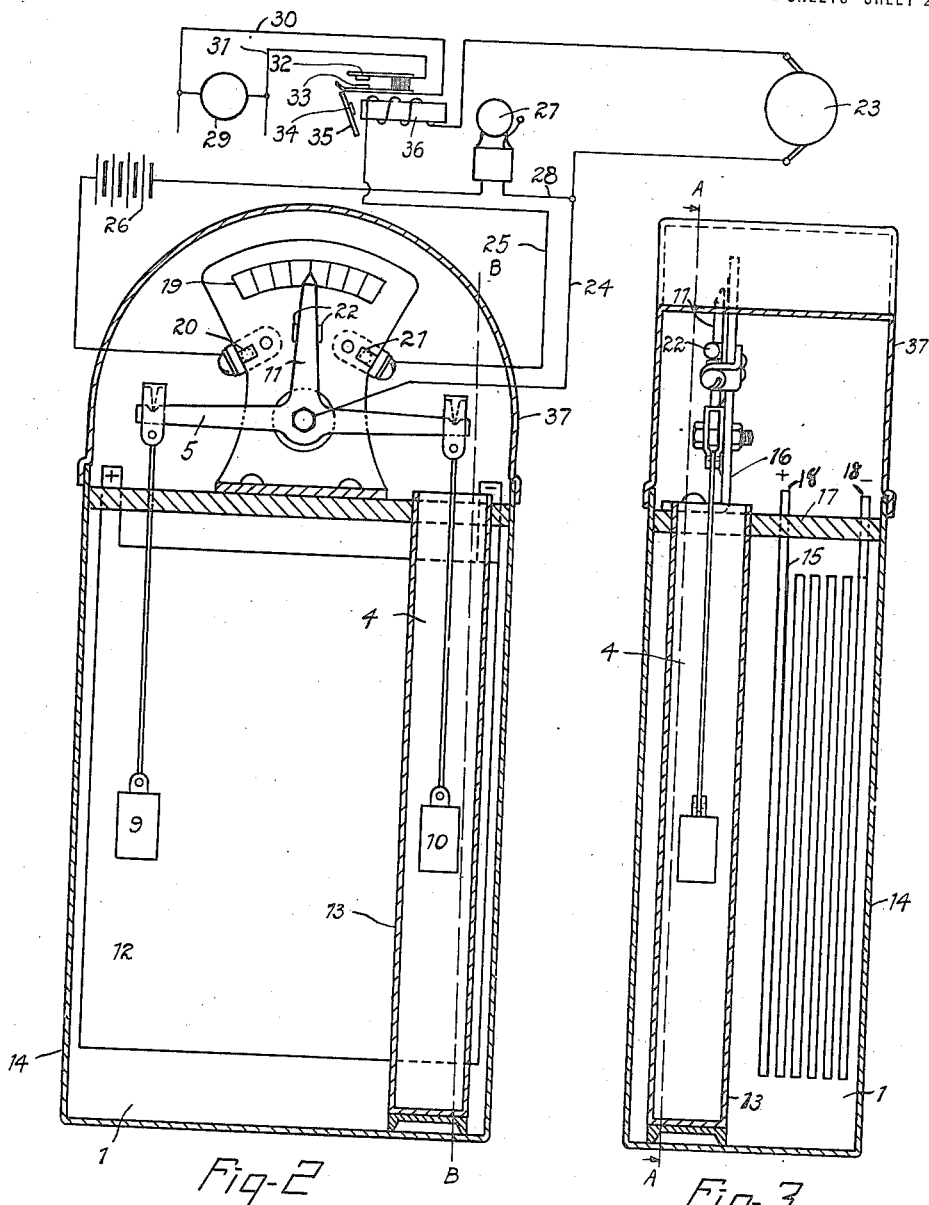

UNITED STATES PATENT OFFICE.

FRANK O. HARTMAN AND CLARK T. ANDERSON, OF MANSFIELD, OHIO.

SPECIFIC-GRAVITY DEVICE.

1,424,403.      Specification of Letters Patent.      Patented Aug. 1, 1922.

Application filed May 24, 1920. Serial No. 383,986.

*To all whom it may concern:*

Be it known that we, FRANK O. HARTMAN and CLARK T. ANDERSON, both citizens of the United States, residing at Mansfield, in the county of Richland and State of Ohio, have invented certain new and useful Improvements in Specific-Gravity Devices; and we do hereby declare the following to be a full, clear, and exact description of the invention, such as will enable others skilled in the art to which it appertains to make and use the same.

This invention relates to specific gravity devices. As is well known, the specific gravity of a liquid usually is obtained by taking account of the buoyancy of the liquid in respect to a body submerged therein. The submerged body displaces liquid equal to its own volume and hence the buoyant force exerted on the body is equal to the weight of the volume of liquid displaced. The volume of liquid changes with the temperature and generally the temperature co-efficient of expansion is positive. Therefore, an increase in the temperature will lessen the buoyancy with respect to the submerged body, or in other words, will reduce the specific gravity. In many cases it is desired to indicate the changes in the specific gravity of the liquid due only to causes other than temperature changes.

It is one object of our invention to provide means for indicating changes in specific gravity of a liquid that are due only to causes other than changes in temperature and eliminate any indications of changes in specific gravity due to temperature changes.

It is another object of our invention to associate our improvement with a storage battery and charging apparatus in such a way that when the battery is fully charged, the charging operation will be discontinued, and when the battery is discharged, a signal will be given to call attention to the fact that charging apparatus should again be put into operation.

Other objects will appear in the following description, reference being had to the drawings, in which:

Fig. 2 is a sectional elevation of a storage battery taken on the line A—A of Fig. 3 with which our invention is shown associated.

Fig. 3 is a sectional elevation on line B—B of Fig. 2.

Figure 1:
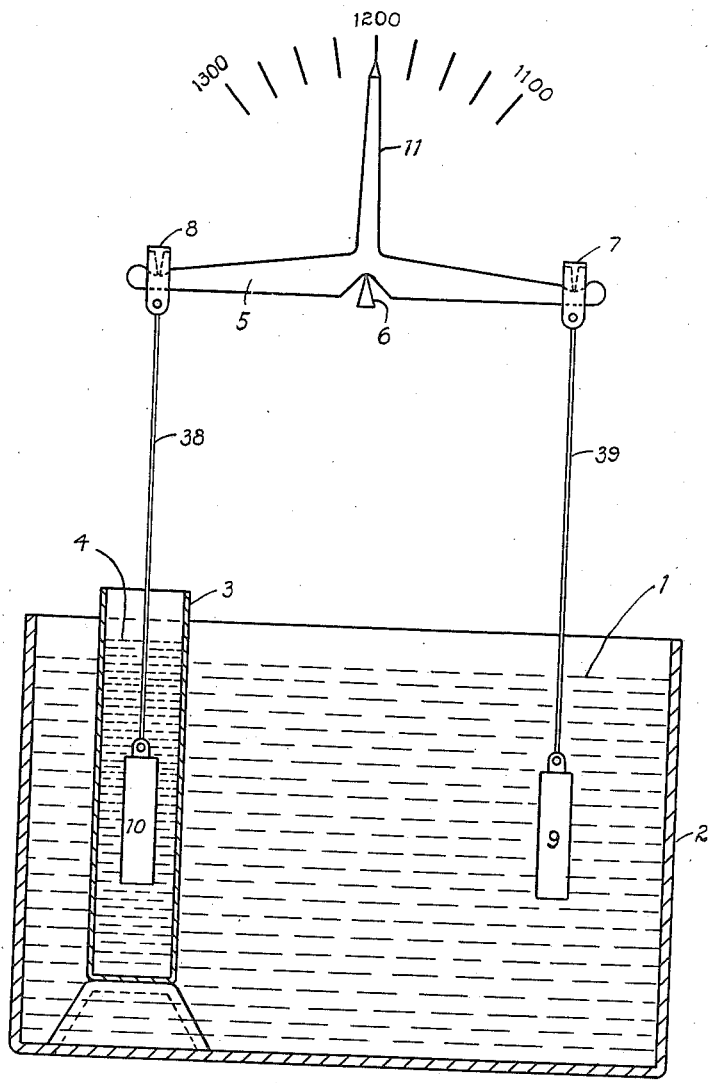
Fig. 1 is a sectional elevation of apparatus embodied in our invention.

Referring to the drawings, in Fig. 1 the liquid, whose specific gravity is involved, is indicated by reference character 1, being enclosed in any suitable container 2. A second container 3 for liquid 4, having substantially the same coefficient of expansion as liquid 1, is provided, and this container is placed closely adjacent to the liquid 1, so that it will always have substantially the same temperature as the latter. A preferable way to secure this result is to place the tube or container 3 directly in the liquid 1, so that it will be entirely surrounded thereby. Since the tube 3 is of small diameter, as compared to the body of liquid 1, it will remain at the temperature of the latter, especially when the temperature changes are gradual, as would take place from temperature changes in the surrounding room, or from many other causes.

A beam 5 is suspended at a point 6 intermediate its ends 7 and 8. A weight 9 is suspended from the end 7 in such a way as to be submerged in the liquid 1, while a weight 10 suspended from the end 8 of the beam is submerged in the liquid 4. In case the liquids 1 and 4 are corrosive in nature, the weights 9 and 10 will be suspended by means of some metal or material capable of resisting the corrosive action of the liquids, and the weights, of course, will be made of some such material.

The action of the specific gravity device is as follows: Let it be supposed that in the position shown in Fig. 1, the weights and beam are so proportioned and arranged that the pointer 11 attached to the beam indicates the specific gravity of the liquid 1 at a normal temperature of, say 70° F. Now, if the temperature of the liquid 1, either from internal or external causes, increases to say, 90°, the temperature of liquid 4 will also increase to this temperature, and the reduction in buoyancy of liquid 1 will be exactly counter-balanced by the reduction in buoyancy of liquid 4. The needle 11 will, therefore, remain at the point indicated.

If the temperature of liquid 1 had decreased to, say 40° F., the increase in buoyancy of liquid 1 would have been exactly counter-balanced by the increase in buoyancy of liquid 4. If we suppose that the specific gravity of liquid 1 increases, for some reason or other, which does not affect liquid 4, or if a heavier liquid is substituted for liquid 1, the needle 11 will swing over to some position, say 1300 on the scale, because the buoyant effect of liquid 1 increases, while the buoyant effect of liquid 4 remains exactly the same as before, supposing that no temperature change has taken place. Likewise, if the specific gravity of liquid 1 decreases, or a lighter liquid is used, the buoyant effect of liquid 4 will remain constant, no temperature change having taken place. This will swing the pointer 11 over to some position, such as 1100 on the scale. If the temperature of liquid 1 changed during the change of specific gravity due to other causes, it will be understood from what has just been described, that this change of temperature will be communicated to liquid 4 and compensation will take place, so that an exact indication of the specific gravity due to causes other than temperature changes will be given.

The improvement previously described is capable of many different uses, but, by way of example, we will describe its connection with storage batteries, as it is admirably suited for this use.

In Fig. 2 we have shown a section of a storage battery with the specific gravity indicator in connection therewith. The weight 9 is shown suspended in the electrolyte 12 of a storage battery, while the weight 10 is suspended in the tube 13, closely adjacent to the electrolyte 12, and preferably surrounded thereby. The details of the battery may be variously arranged, but, by way of example, we have shown the jar 14 as having sufficient width to permit the tube 13 and the weight 9 being placed at one side of the series of plates 15. The beam 5 is pivoted to a vertical standard 16 secured in any way to cover 17 through which the terminals 18 protrude, which standard is provided with a scale 19. Since we prefer to arrange the device in such a way that it will automatically stop the engine or propelling means of a generator that is charging the battery, we arrange two contacts 20, 21 on the standard 16 in such a way that a contact 22 on the pointer 11 will engage with either the one or the other of the first-mentioned contacts when in extreme positions.

The generator 23, which is adapted to charge the battery by connections not shown, has one terminal 24 connected to the scale beam 5 in any way, and the other terminal 25 is connected to contact 21. The contact 20 is connected to a source of energy, such as a battery 26, and the latter is connected to one terminal of an indicating device 27, such as a vibrating bell. The other terminal of the indicating device is connected to the scale beam 5 by joining the conductor 28 with the conductor 24, or by any other means.

While the source of power acting on the generator 23 may be of any kind whatever, we have assumed, by way of example, that it is an engine of the explosion type. This engine will have a timer, indicated conventionally at 29, the operation of which will be well understood. This timer has conductors 30 and 31 leading to contacts 32 and 33, respectively. In the conductor 25, previously referred to, is an electromagnet coil 36 arranged adjacent to the armature 34, so that the energization of the coil will move the armature and bring contact 32 into engagement with contact 33, thereby short circuiting the timer 29.

It is desirable to arrange some suitable cover 37 over the beam 5 and associated parts, and this may be made of some transparent material, so that the indicating lever may be observed to learn the state of charge of the battery.

The operation of the storage battery charging arrangement will now be described. It is well known that the specific gravity of the sulphuric electrolyte of a storage battery of the lead-sulphuric type increases with increase in charge, and conversely, decreases with decrease in charge. It will also be understood from the previous description of the apparatus shown in Fig. 1 that the change in temperature of the electrolyte 12, will not affect the indicating device, but only changes of specific gravity of the electrolyte from causes other than changes of temperature.

In the position of the needle shown in Fig. 2 the storage battery would be substantially half charged, and let it be supposed that the drain on the battery continues until the contact 22 engages contact 20, due to the decrease in specific gravity of the electrolyte 12 in a well known way. This would be substantially the discharged position of the needle 11. As soon as the contacts engage, as described, current will flow from battery 26 through the indicator 27—conductors 28 and 24—beam 5—needle 11 and contacts 22 and 20, back to the battery 26. This will cause the bell to vibrate and give an alarm, so that the state of discharge of the battery will be known. The person in charge of the installation will then start up the gas engine in any well known way, and cause the generator 23 to charge the battery.

The charging of the battery will continue automatically and the gradual increase in the specific gravity of the electrolyte 12 will cause a greater and greater buoyant effect on the weight 9 until at fully charged condition the contact 22 will engage contact 21. This will cause current to flow from the generator 23 through conductor 24—beam 5—pointer 11—contact 22—contact 21—conductor 25—coil 36—back to the generator. This causes the coil 36 to attract armature 34 and bring into engagement the contacts 32 and 33. It will at once be apparent from the drawing that this short-circuits the timer 29 and consequently the engine stops and the charging of the battery ceases through the stopping of the generator 23 and the disconnection of the latter from the battery through means well known in the art, which are not shown.

It will be understood by those skilled in the art that during the charging of a storage battery of the lead-sulphuric acid type the temperature of the electrolyte increases, due to the $I^2 R$ loss. If some compensating device were not used, the indicating needle 11 would be moved to positions that would not correctly correspond to the battery charge. With our improvement, however, it will be apparent that compensation will automatically take place for changes in temperature of the electrolyte 12 from the cause referred to, or from any other cause, as the temperature of the liquid 4 in the tube 13 will always be substantially the same as the temperature of the electrolyte.

Further explanation of the compensating means need not be given, as it will be fully understood from the previous description of the apparatus in Fig. 1.

Various liquids may be used in the tube 13, but, by way of example, we may refer to the use of water. By properly proportioning the volume and mass of the weights 9 and 10 and the length of the lever arms to which they are attached, correct compensation for all practical purposes will be secured. The coefficient of expansion of the water in tube 4 will be substantially the same as that of the electrolyte during the changes of specific gravity between discharged and charged conditions.

The weights 9 and 10 may be made of glass or any material not acted upon by the liquids 4 and 12. For practical purpose, it will probably be found more suitable to use glass bulbs in which is sealed the correct amount of shot or other metal. The suspending wires or strands 38, 39 may be made of platinum, gold or any other material not acted on to any extent by the liquids 4 and 12.

It will be apparent that any indicating device may be used in place of the bell 27, and that also in the discharged position, other arrangements may be made for taking care of the battery to bring about the proper charging thereof. Also, other arrangements may be made for disconnecting the power from the generating apparatus, without departing from the spirit of the invention.

While we have shown the tubes 3 and 13 surrounded by the liquid whose specific gravity is to control the positions of the indicating device, it will be apparent that any other arrangement may be used to keep the temperature of the two liquids substantially the same. The invention is, therefore, not limited to the specific disclosure which was given by way of example only.

While we have illustrated a preferred embodiment of our invention employing preferred instrumentalities for effecting the results sought to be secured by our invention, we are aware that numerous and extensive departures may be made from the embodiment herein illustrated and described, including the said instrumentalities, but without departing from the spirit of our invention.

Having described our invention, what we claim is:

1. In a specific gravity device for a liquid, a beam pivoted between its ends, a weight attached to one end of the beam and extending into said liquid, a tube in said liquid containing a second liquid having substantially the same coefficient of expansion as the other liquid, a weight suspended in the second-mentioned liquid and attached to the other end of said beam, whereby changes in buoyancy of the first-mentioned liquid, due to temperature variations, are compensated by changes in buoyancy in the second-mentioned liquid.

2. In specific gravity devices for a storage battery, a container for a liquid closely adjacent to the electrolyte in said storage battery, a weight in the electrolyte, a second weight in said liquid and connections between said weights whereby changes in buoyancy of said electrolyte due to temperature variations are compensated by changes in buoyancy in the second-mentioned liquid.

3. In specific gravity devices for a storage battery, a tube extending into the electrolyte of the battery, a liquid in said tube having substantially the same coefficient of expansion as said electrolyte, a beam pivoted between its ends and weights in said electrolyte and liquid and said weights attached to opposite ends of said beam.

4. In specific gravity devices for a storage battery, a tube extending into the electrolyte of the battery, a liquid in said tube having substantially the same coefficient of expansion as said electrolyte, a beam pivoted between its ends, a pointer on said beam and weights in said electrolyte and liquid attached to opposite ends of said beam.

5. In specific gravity devices for a storage battery, a tube extending into the electrolyte of the battery, a liquid in said tube having substantially the same coefficient of expansion as said electrolyte, a beam pivoted between its ends, an electric contact on said beam, weights in said electrolyte and liquid attached to opposite ends of said beam, a source of energy for charging said battery, an additional contact adapted to be engaged by the first-mentioned contact and means for disconnecting said source of energy from the battery when said contacts are brought into engagement with each other.

6. In specific gravity devices for a storage battery, a tube extending into the electrolyte of the battery a liquid in said tube having substantially the same coefficient of expansion as said electrolyte, a beam pivoted between its ends, an electric contact on said beam, weights in said electrolyte and liquid said weights attached to opposite ends of said beam, a source of energy for charging said battery, an additional contact adapted to be engaged by the first-mentioned contact and means for indicating when said contacts are brought together.

7. In specific gravity devices for a storage battery, a tube extending into the electrolyte of the battery, a liquid in said tube having substantially the same coefficient of expansion as said electrolyte, a beam pivoted between its ends, electric contacts on said beam, weights in said electrolyte and liquid said weights attached to opposite ends of said beam, a source of energy for charging said battery, additional contacts adapted to be engaged by the first mentioned contacts, means for disconnecting said source of energy from the battery when certain of said contacts are brought into engagement with each other, and means for indicating when the other of said contacts are brought into engagement.

8. In combination, a storage battery, a tube extending into the electrolyte of the storage battery, a liquid in said tube having substantially the same coefficient of expansion as said electrolyte, a beam pivoted between its ends, an arm on said beam, weights in said electrolyte and said liquid attached to opposite ends of said beam, said beam adapted to rock said arm, a set of electrical contacts disposed on one side of the said arm, a source of electric current and an electro-responsive device serially connected with the said contacts in the said circuit.

9. In combination, a storage battery, a tube extending into the electrolyte of the storage battery, a liquid in said tube having substantially the same coefficient of expansion as said electrolyte, a beam pivoted between its ends, an arm on said beam, weights in said electrolyte and said liquid attached to opposite ends of said beam, said beam adapted to rock said arm, a set of electrical contacts disposed on one side of the said arm, a source of electric current, an electro-responsive device serially connected with the said contacts in the said circuit, a set of contacts adapted to be operated when the arm is rocked in the opposite direction and an electrical circuit including a source of current and electro-responsive device serially connected in the said circuit.

In witness whereof, we have hereunto signed our names this 18 day of May, 1920.

FRANK O. HARTMAN.
CLARK T. ANDERSON.